July 11, 1950 F. O. HESS ET AL 2,515,086
HEAT-TREATING APPARATUS
Filed Sept. 18, 1946 8 Sheets-Sheet 4

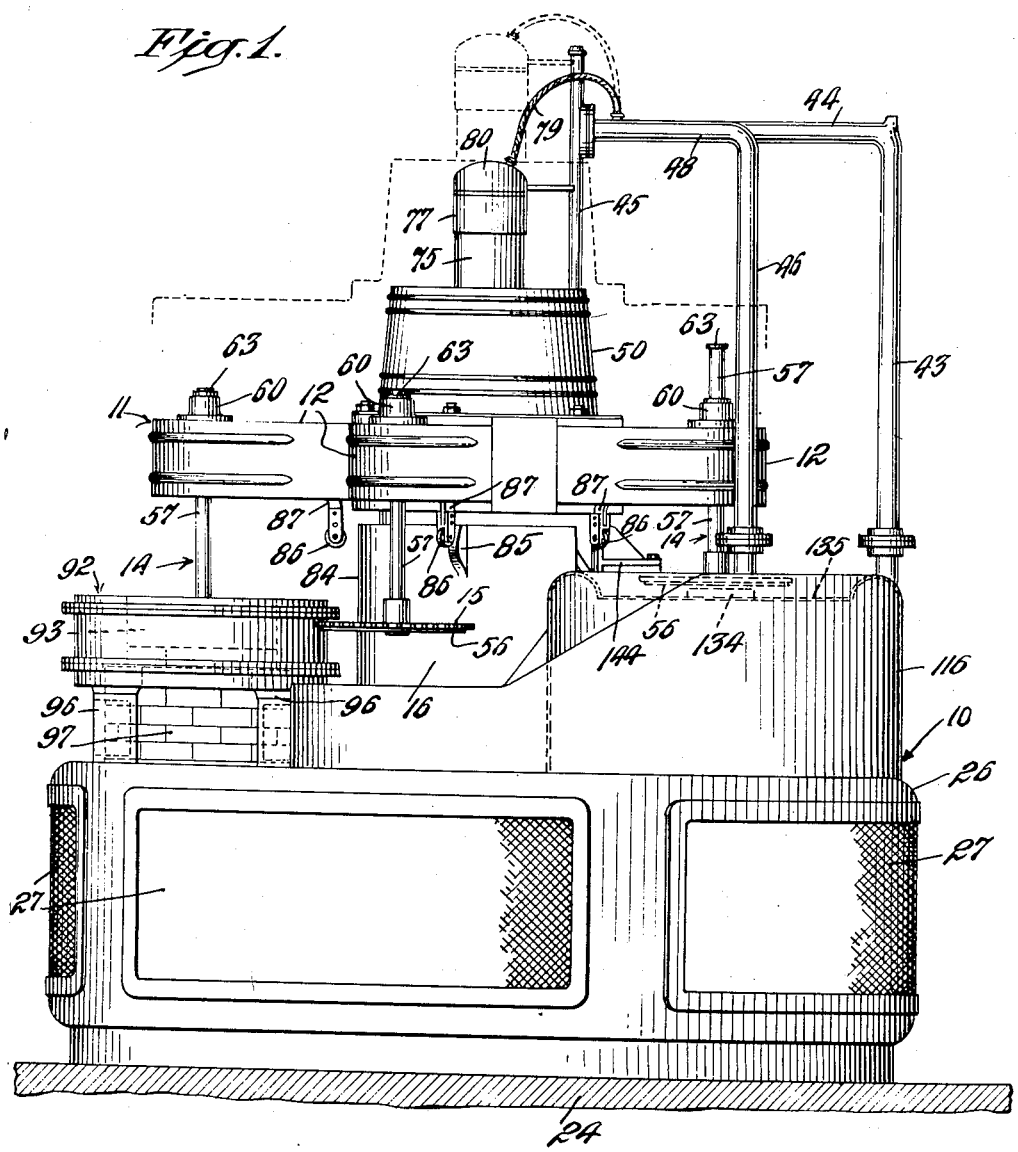

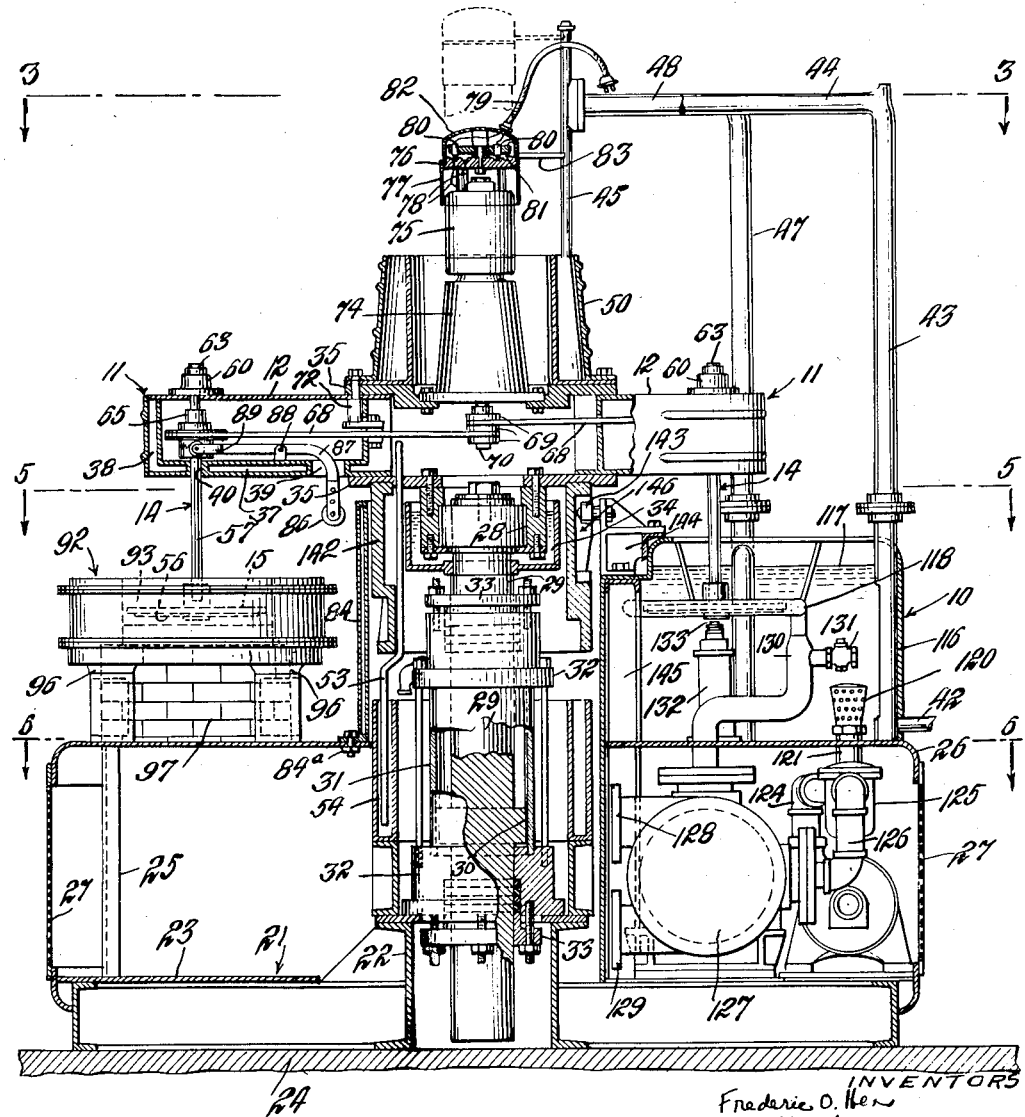

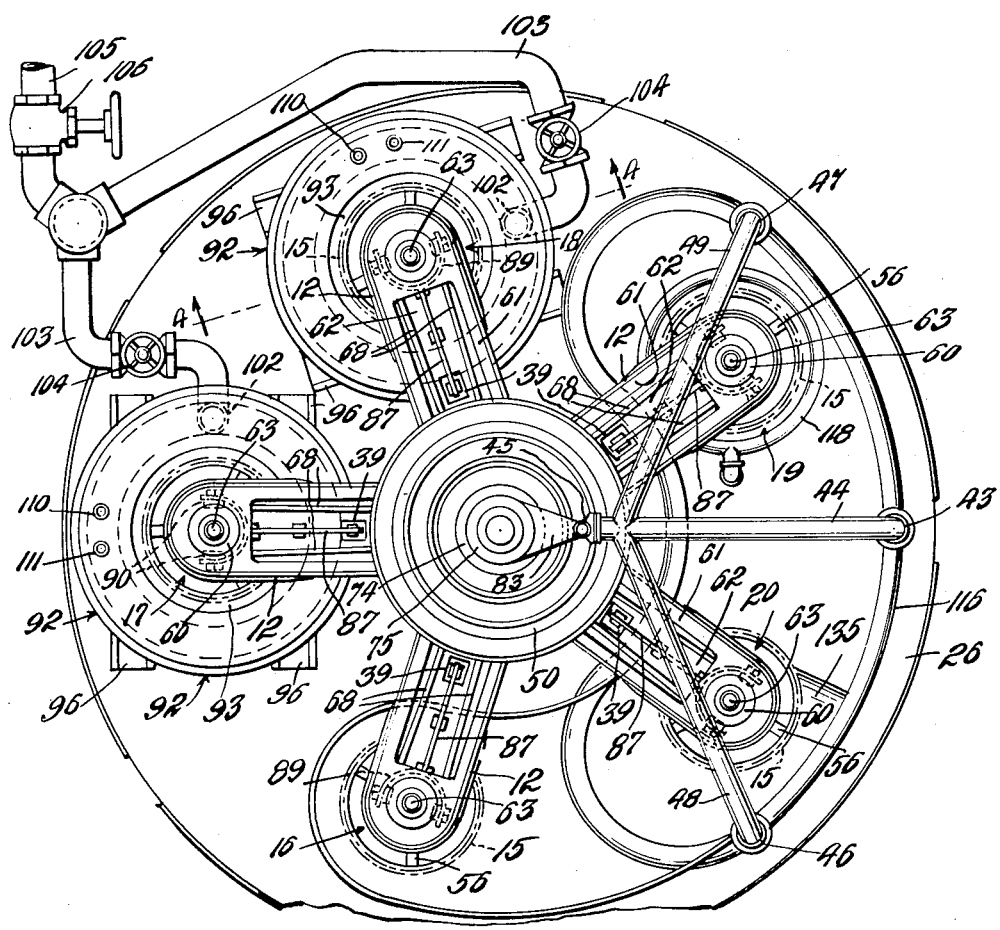

WITNESS
F. J. Hartman

INVENTORS
Frederic O. Hess
Fred Maud
William B. Troup
BY E.A. Fernander
their ATTORNEY July 11, 1950  F. O. HESS ET AL  2,515,086
HEAT-TREATING APPARATUS
Filed Sept. 18, 1946  8 Sheets-Sheet 5
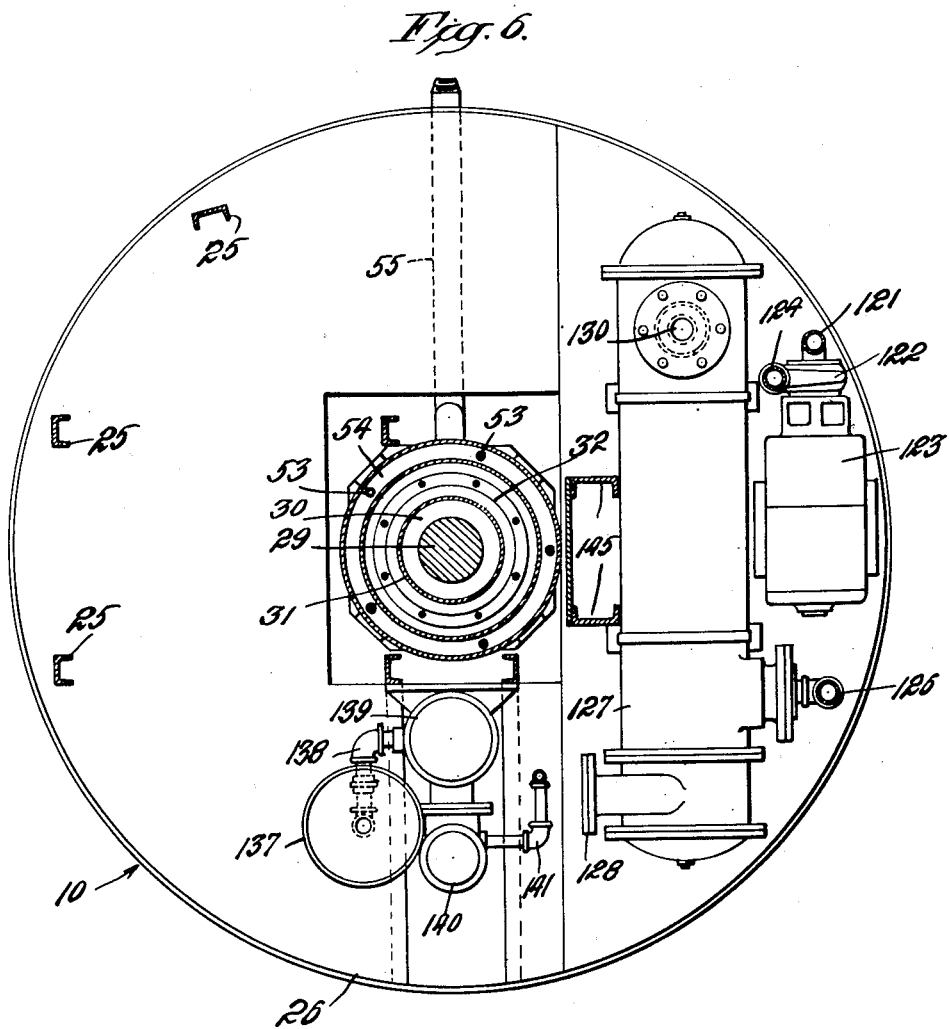

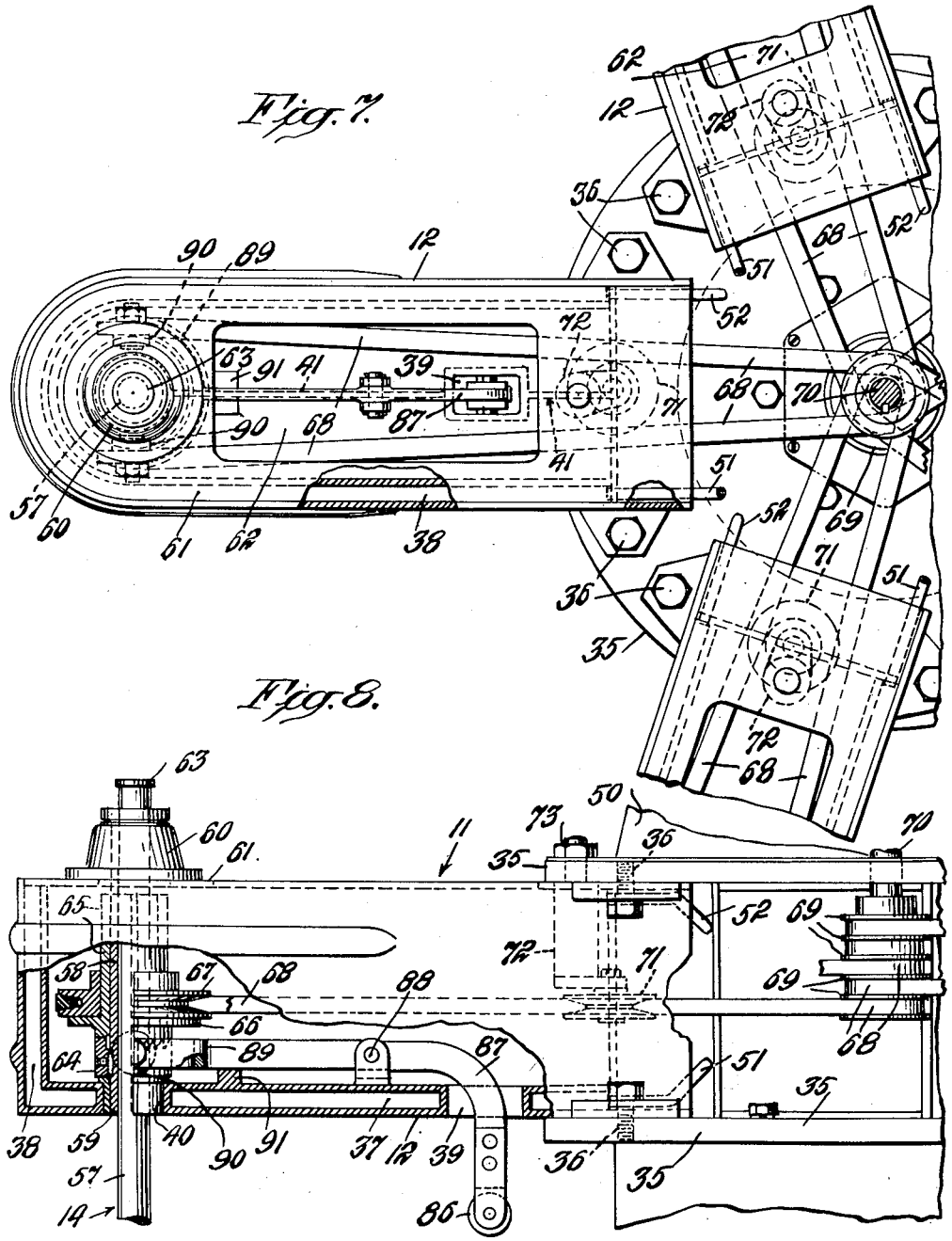

July 11, 1950    F. O. HESS ET AL    2,515,086
HEAT-TREATING APPARATUS
Filed Sept. 18, 1946    8 Sheets-Sheet 7

WITNESS
F. J. Hartman.

INVENTORS
Frederic O. Hess
Fred Maret
William B. Troupe
BY Ed Fernandez
their ATTORNEY

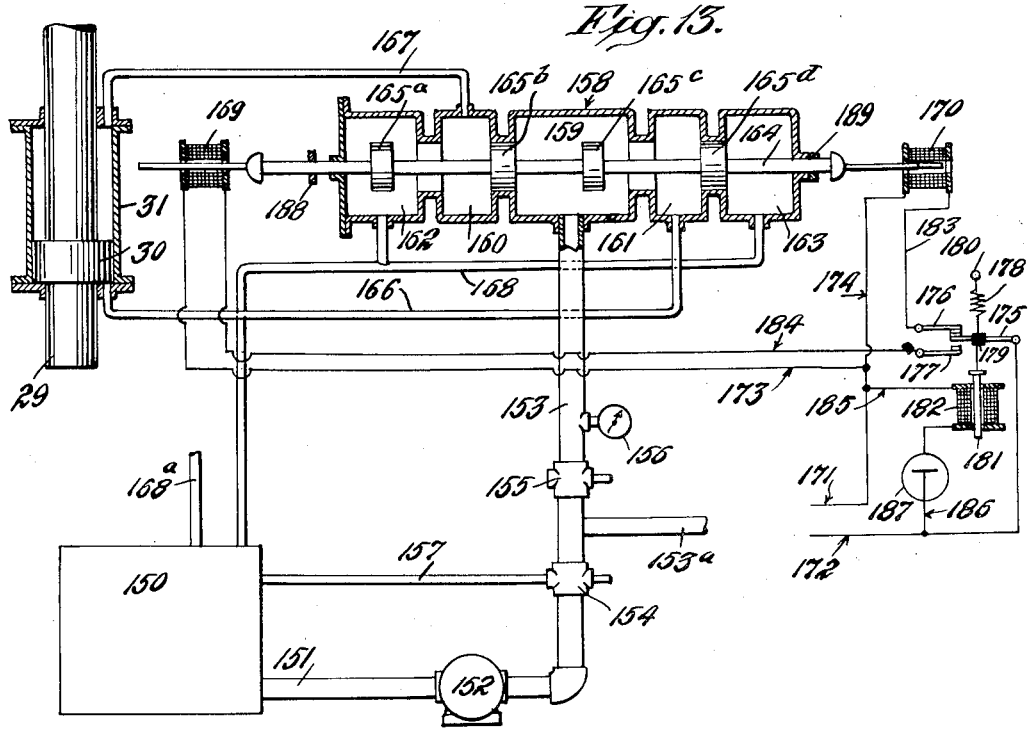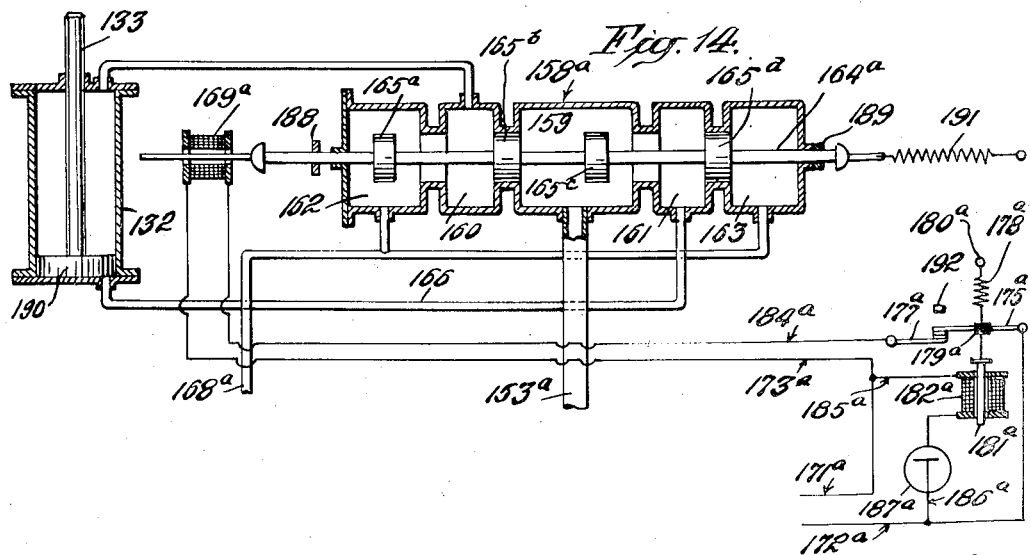

Patented July 11, 1950

2,515,086

UNITED STATES PATENT OFFICE 2,515,086

HEAT-TREATING APPARATUS

Frederic O. Hess, Fred Maud, and William B. Troupe, Philadelphia, Pa., assignors to Selas Corporation of America, Philadelphia, Pa., a corporation of Pennsylvania Application September 18, 1946, Serial No. 697,624

13 Claims. (Cl. 266—4)

This invention relates to heat treating apparatus, and more particularly to an improved machine for continuously and automatically heat treating a number of like or similar metallic pieces in rapid succession.

A principal object of the invention is to provide heat treating apparatus for continuously and automatically heat treating a number of similar or like metallic work pieces in rapid succession which will be reliable and sensitive in operation and which will not readily get out of adjustment, so that substantial uniform heat treatment of the work pieces is effected. This is accomplished by providing a heat treating machine having a number of spaced apart operating stations at which the work pieces are heated and cooled, and a rotatable carriage having a plurality of spaced apart work supporting fixtures for the work pieces. Suitable mechanism is provided for intermittently moving the carriage at definite intervals of time in such a manner that the carriage is alternately raised and lowered as well as rotated to move each work supporting fixture from one station to a succeeding station in a path of movement which includes an initial increment of movement which is generally upward and a final increment of movement which is generally downward.

More specifically, the carriage is mounted on and rotatably supported by a vertical post which is intermittently raised and lowered rapidly, and a suitable cam device is provided which, during such upward and downward movement of the post, is capable of imparting a turning or angular movement to the carriage to carry the work supporting fixtures from one station to a succeeding station in the manner just described. In the embodiment of the invention disclosed herein, the cam device includes a cylindrical cam member fixed to the carriage which is formed with a race and a stationary cam follower which cooperates with the race. The cam race is of such shape that when the vertical post and carriage mounted thereon are alternately raised and lowered, movement is imparted to the carriage to carry the work supporting fixtures from one station to a succeeding station in a path of movement which includes an initial increment of movement which preferably is more or less straight upward and a final increment of movement which preferably is more or less straight downward.

Further, the cam race of the cam member is of such shape that the carriage and work fixtures thereon are always moved forward from one station to a succeeding station and cannot move backward. Moreover, a cam race is provided for the cam device which permits the carriage to turn freely to carry the work supporting fixtures from one station to a succeeding station when the vertical movement of the carriage is reversed after being raised a definite distance by the post upon which it is mounted. In other words, when the carriage is alternately raised and lowered the carriage does not come to a complete stop when its direction of vertical movement is reversed; and the angular momentum imparted to the carriage during its upward movement is advantageously utilized at the moment its direction of vertical movement changes to continue the desired movement of the carriage until the work supporting fixtures reach the stations to which they are being carried.

In accordance with the invention, the work pieces to be heat treated are moved from a work loading and unloading station to one or more heating stations and to a quench station from which the work pieces are returned to the work loading and unloading station. In the preferred embodiment of the invention disclosed herein, a cooling station is also interposed between the quench station and the work loading and unloading station. By carrying the work supporting fixtures from each station to a succeeding station in a path of movement in which the initial increment of movement is generally upward and the final increment of movement is generally downward, the one or more heating stations may be formed to more or less completely encircle the work pieces when the latter are positioned therein. By advancing the work pieces to the same identical position at the one or more heating stations in the manner just described and accurately timing the heating periods by controlling the intermittent movement of the carriage, successive work pieces are accurately heated in an identical manner.

Likewise, by reason of the particular manner in which the work pieces are carriaged from one station to a succeeding station, the quench station may include a suitable spray device which is submerged in a body of quench liquid and adapted to encircle successive work pieces carried to the quench station. By delivering quench liquid under pressure to such spray device, quench liquid can be effectively applied to particular surfaces of the heated work pieces to promote rapid and uniform cooling of each work piece in the same manner as other work pieces.

In order to control accurately the intermittent movement imparted to the rotatable carriage, suitable mechanism and associated control is provided for intermittently raising and lowering the vertical post upon which the carriage is mounted. This may be accomplished by providing a hydraulic cylinder whose cylinder rod serves as the vertical post to which the carriage is fixed, and by controlling the supply of hydraulic fluid under pressure to the hydraulic cylinder to raise and lower the cylinder rod in definite intervals of time, each upward stroke and subsequent downward stroke of the cylinder rod taken together constituting a complete cycle of movement necessary to carry the work supporting fixtures from one station to a succeeding station.

In order to promote uniform and rapid heating and cooling of the work pieces at the heating and quench stations, suitable driving mechanism is mounted on the carriage for turning the work supporting fixtures. In order to facilitate the removal of heat treated work pieces from the fixtures at the work loading and unloading station and the positioning of fresh work pieces on the fixtures at that station, provision is made for reducing the turning movement of the fixtures at the work loading and unloading station. Preferably, the fixtures at the work loading and unloading station are brought to a complete stop and disconnected from the driving mechanism to facilitate the removal of heated work pieces and the positioning of fresh work pieces on the work supporting fixtures.

In addition, mechanism may be embodied in the heat treating machine of the invention to effect so called "time quenching" of the heated work pieces. To this end the work supporting fixtures are vertically movable on the carriage and suitable mechanism is provided at the quench station whereby each work supporting fixture moved to that station may be raised independently of the other fixtures after a predetermined interval of time to lift each quenched work piece out of the body of quenching liquid. Although the quenched work pieces are independently raised out of the quench liquid at the quench station, such lifting of the quenched work pieces during the intervals of time the carriage is stationary does not affect the operations being accomplished at the other stations; and, when the carriage is again moved to carry the work pieces from one station to a succeeding station, the work piece at the quench station is automatically moved from its raised position at that station to the next succeeding station.

In order to protect parts of the machine from over heating, provision is made for cooling those parts subjected to the high temperature heat produced at the one or more heating stations. Thus, the parts of the carriage which are closely adjacent to the heat sources at the one or more heating stations are preferably cooled by a suitable cooling liquid. Likewise, the cylindrical cam member is preferably shielded from the one or more heating stations by a hollow wall through which a cooling liquid is circulated.

The invention, together with the above and other objects and advantages thereof, will be more fully understood from the following description taken in conjunction with the accompanying drawings forming a part of this specification, and of which:

Fig. 1 is an elevation view of heat treating apparatus embodying the invention;

Fig. 2 is a view generally similar to Fig. 1, partly broken away and in section, to illustrate the construction of the apparatus more clearly;

Fig. 3 is a horizontal plan view of the apparatus taken at line 3—3 of Fig. 2;

Fig. 4 is an enlarged vertical sectional view, taken at line 4—4 of Fig. 3, of one of the heating units which serves as a heating station;

Fig. 6 is a horizontal sectional view, taken at line 6—6 of Fig. 2, to illustrate details of the heat treating apparatus;

Fig. 7 is an enlarged fragmentary plan view of the rotatable work supporting carriage seen in Figs. 1 to 3;

Fig. 8 is an enlarged side elevation, partly broken away and in section, of one of the radially extending arms of the work supporting carriage;

Figs. 13 and 14 are schematic views diagrammatically illustrating the control system for automatically operating the heat treating apparatus of Figs. 1 to 12 inclusive.

Figure 5:
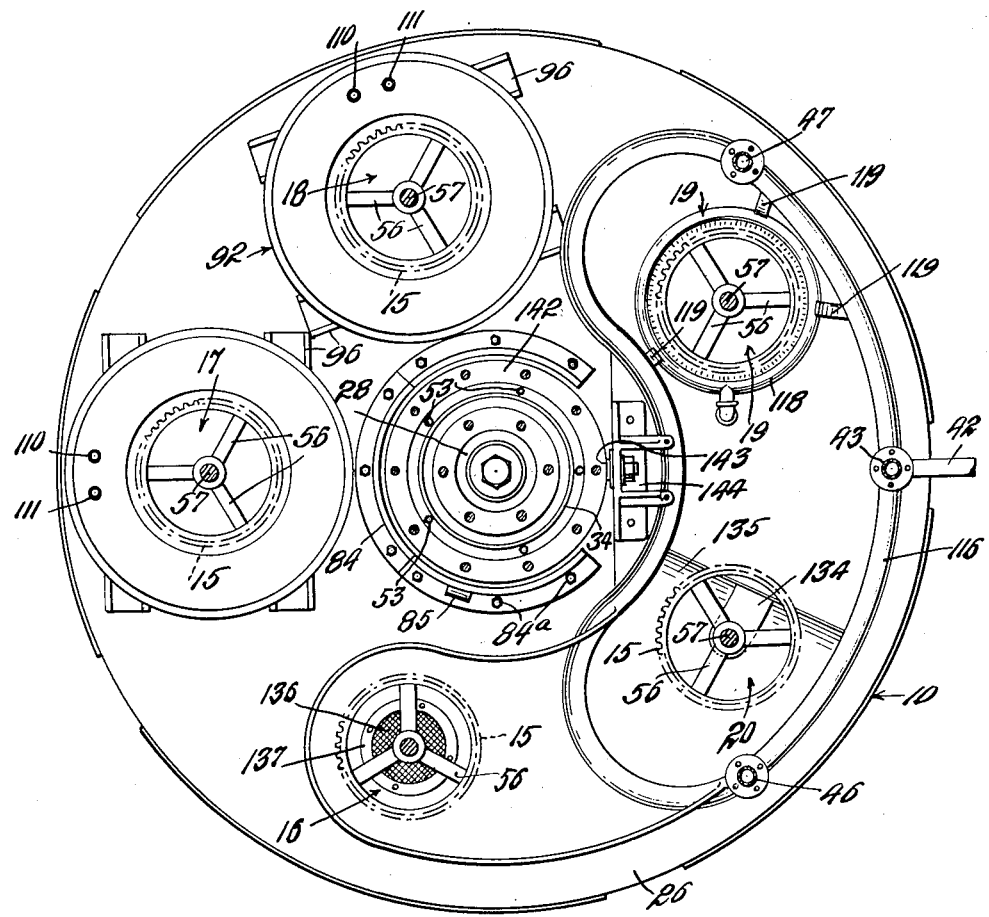
Fig. 5 is a horizontal view, taken at line 5—5 of Fig. 2, to illustrate the relative positions of the work loading and unloading station, heating stations, quenching station and cooling station.
Figure 9:
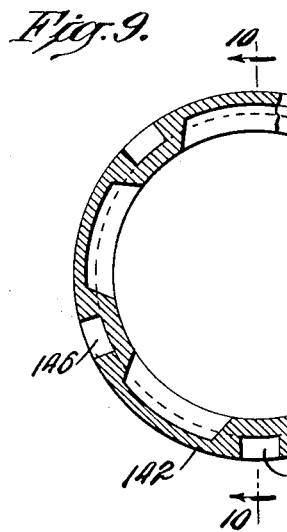
Fig. 9 is an enlarged plan view, partly in section, of the cylindrical cam member of the work supporting carriage for indexing the rotating movement of the carriage.
Figure 10:
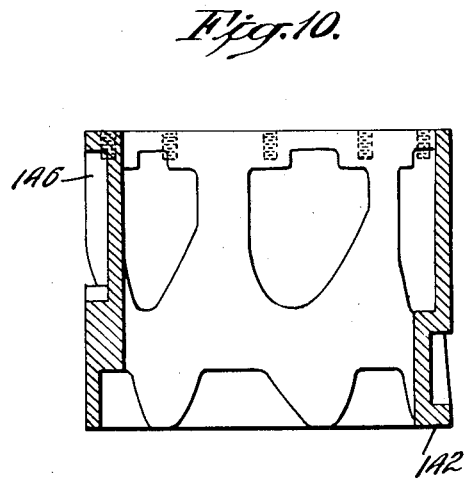
Fig. 10 is a vertical sectional view of the cylindrical cam, taken at line 10—10 of Fig. 9.
Figure 11:
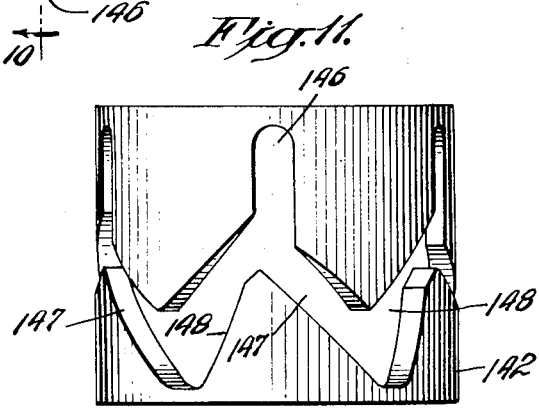
Fig. 11 is a side elevation of the cylindrical cam shown in Figs. 9 and 10.

Referring more particularly to Figs. 1, 2, 3 and 5, the heat treating apparatus of the invention comprising a stationary base structure 10 above which is disposed a rotatable carriage structure or turntable 11 having five radially extending arms 12. From the outer ends of the arms 12 depend work supporting fixtures 14 whose lower ends are formed to support work pieces 15 adapted to be heat treated.

The rotatable carriage 11 is arranged to move each fixture 14 and work piece supported thereon from a loading and unloading station 16 successively to first and second heating stations 17 and 18, a quench station 19, and a cooling station 20 back to the loading and unloading station 16. When the work pieces 15 are moved from each station to the next succeeding station by the rotatable carriage 11, the carriage initially moves vertically upward for a definite distance and then begins to move angularly about its axis, such angular movement of the carriage being accompanied by further upward vertical movement thereof followed by downward vertical movement thereof as each fixture 14 approaches the station to which it is being moved.

When the carriage 11 has turned or rotated about its axis such a distance that the fixture is at a definite position over the station to which it is being moved, the carriage 11 finally moves vertically downward and comes to a stop. After a definite interval of time the carriage 11 again turns about its axis to move each work piece to the next succeeding station until it reaches the loading and unloading station 16 where it is removed.

Each work piece 15 is rotated continuously by its supporting fixture 14 after it leaves the loading and unloading station 16 until it returns to that station. At the loading and unloading station the fixtures 14 do not rotate and remain stationary to facilitate the removal of heat treating work pieces therefrom and the positioning on the fixtures of fresh work pieces to be heat treated.

As shown in Fig. 2, suitable framework 21 including a centrally disposed box-like section 22 and a number of horizontal sections 23 extending radially outward therefrom, is adapted to be supported on a foundation 24. Riser sections 25 extend upward from the horizontal sections 24 and serve as structural supports for parts of the heat treating apparatus to be described presently.

A sheet metal shell 26 of cylindrical form is provided about the framework 21 and fixed thereto in any suitable manner, as by welding, for example. The side wall of the shell 26 may be provided with removable screened panel sections 27, as shown in Fig. 1, to provide adequate ventilation of the interior of the shell and obtain easy access therein.

The rotatable carriage 11 is supported and journaled at 28 at the extreme upper end of an elongated hydraulic cylinder rod 29 having a piston 30 intermediate the ends thereof which is vertically movable in a cylinder 31. The cylinder 31 at its opposite ends is provided with apertured closure members 32 through which the rod 29 passes. Packing glands 33 are provided for the rod 29 at the closure members 32 to prevent leakage of fluid from the interior of the cylinder 31. Such fluid is alternately introduced under pressure to opposite ends of the cylinder 31, as shown in Fig. 13 and described more fully hereinafter, to cause the rod 29 to move alternately upward and downward and impart the desired rotatable movement to the carriage 11.

The lower end or closure member 32 of the cylinder 31 is supported upon the top of the hollow box-like section 22 of the framework 21. Such support for the cylinder 31 is at an adequate height to permit the bottom part of the rod 29 to move downward to its lowermost position, as shown in Fig. 2.

The carriage may be supported and journaled at 28 in any suitable manner, as by a combination thrust and radial roller bearing, for example; and a pan 34 fixed to the rod 29 and movable therewith may be provided to hold a body of oil in which such bearing is always immersed.

The rotatable carriage 11 comprises spaced apart ring-shaped plates 35 to which are secured at 36 the flanged inner ends of the radial arms 12, as shown in Figs. 7 and 8. Each arm 12 includes structure providing a hollow bottom 37 and an upstanding hollow side wall 38 communicating therewith which is U-shaped in horizontal section. The hollow bottom 37 of each arm 12 is formed with openings 39 and 40 midway between the parallel sides of the hollow side wall 38 and also a solid partition 41 in alignment with such openings to divide the hollow bottom into two sections. By providing the partitions 41, each arm 12 is formed with opposing L-shaped hollow chambers which communicate with each other only at the extreme outer end of the arm and at the bend of the hollow side wall 38, as best shown in Fig. 8.

Hence, the radial arms 12 are formed with the hollow walls as just described and a suitable cooling liquid, such as water, for example, is circulated therethrough in order to prevent overheating of the outer parts of the arms 12 when the latter are disposed above the heating stations 17 and 18.

As best shown in Figs. 2 and 5, the cooling liquid is delivered from a suitable source of supply through piping 42 to the lower end of a riser pipe 43. As seen in Fig. 2, the riser pipe 43 extends to a height above the carriage 11 and at its lower end is fixed in any suitable manner to the top of the shell 26. The upper end of the riser pipe 43 is connected to one end of a horizontal pipe 44, the opposite end of which is connected to a vertical pipe 45 intermediate the ends thereof.

To provide a rigid support for the pipes 43, 44 and 45 and maintain the latter accurately positioned above the carriage 11, for reasons which will be explained presently, additional vertical pipes 46 and 47 are mounted on the top of the shell 26 at each side of the pipe 43, as shown in Figs. 1, 2, 3 and 5. The upper ends of pipes 46 and 47 are connected to the outer ends of horizontal pipes 48 and 49, the inner ends of which are secured, as by welding, for example, to the horizontal pipe 46 at a region adjacent to the vertical pipe 45. The pipes 46, 47, 48 and 49 provide a rigid reinforcing framework for the cooling liquid supply piping, it being understood that cooling liquid only flows through the pipes 45, 46 and 47. Hence, the horizontal pipes 48 and 49 are blocked off in any suitable manner at their inner ends, at the connection of these pipes to the horizontal pipe 46, to prevent flow of cooling liquid into the pipes serving only as reinforcing framework.

As shown in Figs. 1 and 2, the upper end of the vertical pipe 45 is closed and cooling liquid is discharged from the lower open end thereof into an annular-shaped tank or reservoir 50 mounted in any suitable manner to the top ring-shaped plate 35 of the carriage 11.

The cooling liquid flows by gravity from the bottom of the reservoir 50 through five flexible conduits (not shown) whose lower ends are adapted to be connected to suitable inlet connections 51, each of which is associated with one of the radial arms 12, as best shown in Figs. 7 and 8.

The cooling liquid delivered to each radial arm 12 through the inlet connection 51 associated therewith passes into the hollow bottom 37 of the L-shaped chamber at one side of the partition 41 therein. The cooling liquid must flow toward the outer bend of the side wall 38 and return through the L-shaped chamber at the opposite side of the partition 41 before being discharged through an outlet connection 52. Moreover, by providing the outlet connections 52 at the extreme upper ends of the side walls 37, as seen in Fig. 8, the hollow walls of each radial arm 12 will always be completely filled with cooling liquid.

The cooling liquid overflows by gravity from the radial arms 12 through the outlet connections 52 into the upper ends of downwardly extending tubes 53 communicating therewith. As best shown in Fig. 2, each tube 53 passes through an opening in the bottom carriage plate 35 and extends downwardly alongside the pan 34. The lower ends of the tubes 53 extend into an annular-shaped trough 54 supported on the box-like section 22 of the framework 21.

When the carriage 11 turns about its axis to move each work supporting fixture 14 from one station to a succeeding station, the carriage 11 moves vertically as well as angularly, as mentioned above and described more fully hereinafter. With such movement of the carriage 11, the tubes 53 not only travel about the trough 54 but also move vertically therein. The cooling liquid is discharged to waste from the bottom of the trough 54 through suitable piping 55 which extends outside the shell 26, as best shown in Fig. 6.

The work loading and unloading station 16 is best shown in Figs. 1 and 5. In the present embodiment of the invention the work pieces 15 by way of example are of annular form and shown as ring gears having teeth at the outer peripheral surface thereof. The work supporting fixtures 14 in this instance are provided with suitable members 56 having three spaced apart radially extending arms to provide a three point support for the work pieces 15. The members 56 are formed of suitable alloy capable of withstanding high temperatures and provide an arrangement whereby an operator can quickly remove such work pieces 15 from and position the work pieces on each member 56 when it moves to the work loading and unloading station 16.

To effect rapid and uniform heating of the work pieces at the heating stations 17 and 18, as will be described hereinafter, it is desirable to rotate the work pieces. This is accomplished by providing suitable mechanism for rotating the work supporting fixtures 14 immediately after each work piece 15 leaves the work loading and unloading station 16 until it returns to that station. To this end each work supporting fixture 14 comprises a vertically disposed rotatable spindle 57 to the lower end of which one of the work supporting members 56 is secured.

As best shown in Fig. 8, the upper part of each spindle 57 is keyed in a bushing 58 through which it extends. The bushings 58 are journaled at their lower ends at 59 at the regions of the openings 48 in the hollow bottoms of the radial arms 12; and at their upper ends in suitable bearings 60 fixed to cover plates 61 provided at the tops of the radial arms 12. The cover plates 61 are formed with enlarged openings 62, as seen in Fig. 7, to provide access to the housings formed in the radial arms.

The spindles 57 are vertically movable in the bushings 58 and formed with enlarged heads 63 which engage the upper parts of the bearings 60 to limit the extent of their downward vertical movement. To the bottom portion of each bushing 58 is fixed a collar 64 having teeth at the top edge thereof. About each bushing 58 is also provided a freely rotatable sleeve 65 having a shoulder 66 intermediate the ends thereof and teeth at its bottom edge adapted to mesh with the teeth at the top edge of the collar 64.

A grooved pulley 67 is fixed to each sleeve 65 and rotatable therewith. The pulleys 67 at the outer ends of the radial arms 12 are driven by endless belts 68 from a number of sheaves 69 fixed to the lower end of a vertical shaft 70 which is in alignment with and above the hydraulic cylinder rod 29. An idler pulley 71 is provided for each belt 68 to adjust the tension of the belts. As shown in Figs. 7 and 8, the idler pulleys 71 are eccentrically mounted at the lower ends of hollow sleeves 72 which are bolt connected at 73 to the top ring-shaped plate 35. By shifting the idler pulleys 71 angularly with respect to the sleeves 72, the tension of each belt 68 may be readily adjusted.

Referring now to Fig. 2, it will be seen that the shaft 70 is driven through speed reducing mechanism 74 from an electric motor 75, such mechanism being mounted at the opening in the top ring-shaped plate 35 and the motor 75 in turn being mounted on the casing of the speed reducing mechanism.

Since the carriage structure 11 moves both angularly and vertically about its axis, suitable provision must be made for energizing the motor 75. This may be accomplished, as shown in Fig. 2, by providing a plate or disk 76 formed of suitable insulating material, such as Bakelite, for example, which is carried by a supporting bracket 77 at the top of the motor 75 and rotatable and vertically movable with the latter. In the top surface of the plate 76 are embedded a pair of annular slip rings connected by conductors 78 to the motor 75. A pair of conductors 79, adapted to be connected to a source of electrical supply, are secured to a pair of brushes 80, each of which is adapted to bear and ride on one of the slip rings. The brushes 80 are suitably mounted in a plate 81 which is formed of insulating material and rotatably mounted on the plate 76. Hence, the motor 75 is energized from the source of electrical supply through the conductors 79, brushes 80, the slip rings over which the brushes ride and the conductors 78.

In order to permit the plate 81 to move vertically with the carriage 11, between the solid and dotted line position of the parts shown in Fig. 2 and at the same time prevent turning movement thereof, that plate is rigidly secured to the inner surface of a cup-shaped shell or housing member 82 having a triangular-shaped bracket 83 projecting outwardly therefrom. The extreme outer end of the bracket 83 is notched and positioned closely adjacent to the vertical pipe 45, as shown in Figs. 2 and 3. The notched bracket 83 freely rides up and down along the pipe 45, thereby permitting the brush plate 81 to move vertically. However, the notched bracket 83 prevents turning of the plate 81 about its axis even though the latter is rotatably mounted on the insulating plate 76 carried by the motor 75.

In view of the foregoing, it will now be understood that the sheaves 69 on the shaft 70 are driven through the speed reducing mechanism 74 by the motor 75, and that the grooved pulleys 67 at the outer ends of the radial arms 12 are driven from the sheaves by the endless belts 68. By providing teeth at the top and bottom edges of each collar 64 and sleeve 65, respectively, these parts serve as cooperating elements of a clutch, whereby the freely rotatable pulleys 67 and sleeves 65 to which such pulleys are fixed drive the collars 64 and bushings 58 fixed thereto and to which bushings the spindles 57 are keyed.

The spindles 57 and work pieces 15 carried thereby are driven continuously after each spindle leaves the work loading and unloading station 16 until it returns to that station. Each spindle 57 is disconnected from the driving mechanism just described when it moves to the work loading and unloading station 16 to facilitate the removal of a work piece from and the positioning of another work piece on each work supporting member 56.

As best shown in Figs. 1, 2 and 5, this is accomplished by providing a C-shaped hollow shell 84 which is disposed about the hydraulic cylinder rod 29 and is secured at its bottom edge at 84a to the top of the shell 26 of the base structure 10. Directly opposite the loading and unloading station 16 the C-shaped shell 84 is formed with an outwardly extending tab 85 adjacent to the top edge thereof.

The tab 85 serves as a cam member and is adapted to be engaged by a roller 86 associated with each radial arm 12 when the carriage 11 is moving a radial arm to the work loading and unloading station 16. As previously mentioned and to be explained more fully hereinafter, the indexing movement of the carriage 11 is such that, as the radial arms 12 move from each station to a succeeding station, the initial and final increments of movement of the carriage 11 are vertically upward and downward, respectively. Hence, as one of the radial arms 12 moves to the work loading and unloading station 16, the carriage 11 turns such an angular distance that the roller 86 on the radial arm moves to a position directly above the tab; and, when the carriage 11 moves vertically downward for the final portion or increment of the indexing movement, the roller 86 moves downwardly against the tab 85 and rides on the sloping outer surface thereof.

As best shown in Fig. 8, the rollers 86 are journaled at the lower forked ends of the short arms of L-shaped members 87 pivoted at 88 within the housings of the radial arms 12. The short arms of the L-shaped members 87 project downwardly through the openings 39 in the hollow bottom walls 37, and the long arms thereof extend toward the spindles 57. Each L-shaped member 87 at the outer end of its long arm is provided with a U-shaped yoke 89 in each arm of which is journaled a roller 90.

After each radial arm 12 leaves the loading and unloading station 16, the L-shaped member 87 is in the position shown in Fig. 8. In such position the long arm of the L-shaped member 87 rests on a stop 91 and the rollers 90 at the yoke 89 are below the shoulder 66 of the sleeve 65 and out of engagement with all parts of the driving mechanism for the spindle 57.

However, when each radial arm 12 moves to the work loading and unloading station 16 and the roller 86 associated therewith rides on the tab 85, the short arm of the L-shaped member is pushed or kicked radially outwardly about its pivot 88, thereby raising or lifting the yoke 89 at the end of the long arm. When this occurs, the rollers 90 at the yoke 89 engage the lower face of the shoulder 66 to raise the hollow sleeve 65, thereby disengaging the teeth at the bottom edge of the sleeve from the teeth of the collar 64. The separation of the collar 64 and hollow sleeve 65 disengages the spindle 57 from its driving mechanism to bring the spindle 57 at the work loading and unloading station to a stop.

When the radial arms 12 are again moved from each station to a succeeding station, the roller 86 associated with the radial arm 12 at the work loading and unloading station 16 leaves the tab 85; and, due to force of gravity, the heavier long arm of the L-shaped member 87 moves downward against the stop 91, whereby the rollers 90 on the yoke 89 also move downward to permit the hollow sleeve 65 to engage the collar 64 and again drive the spindle 57.

From the work loading and unloading station 16 the work pieces 15 are moved successively to the first and second heating stations 17 and 18. As best shown in Fig. 3, identical heating units 92 are provided at both heating stations. Referring more particularly to Figs. 2 and 4, each heating unit 92 is formed to provide an open work receiving space 93 of cylindrical form having a bottom 94 and upstanding side wall 95 formed of refractory material. The heating units 92 are mounted on metallic framework 96 fixed to the top of the shell 26 of the base structure 10. In order to prevent overheating of the shell 26, the framework is embedded in suitable refractory brick work 97 to shield the shell 26 thermally from the heating units.

The cylindrical side walls 95 of the heating units are formed to provide ring-shaped combustion spaces 98 of cross-sectional shape illustrated in Fig. 4. The combustion spaces 98 are provided with restricted outlets 99 for directing high temperature heating gases into the work receiving spaces 93. The restricted outlets 99 extend about the entire peripheries of the side walls 95 so that, when the work pieces 15 are lowered in the work receiving spaces 93 and come to a stop, the elongated outlets 99 are directly opposite the parts of the work pieces to be heated and the heating gases will impinge such parts. The combustion spaces 98 are provided with inlets 100 in the form of screens and through which a combustible gaseous mixture is discharged from a ring-shaped manifold 101 fixed to the bottoms of the refractory side walls. Each screen 100 may comprise a stack of thin plates of refractory material disposed one against the other and formed with vertical slots at the faces thereof to form a multiplicity of tiny passages to subdivide the gaseous mixture entering the combustion space 98 into a plurality of tiny gas streams.

The manifolds 101 are provided with inlets 102 to which are connected conduits 103 each having a valve 104 connected therein. As shown in Fig. 3, the conduits 103 for the heating units 92 are connected to a common supply pipe 105 having a main valve 106, such pipe being adapted to be connected to a source of supply of a suitable combustible gaseous mixture.

When the heating units 92 are relatively cool and at a low temperature, the combustible gaseous mixture supplied thereto passes through the manifolds 101, screens 100 and spaces 98 from which it is discharged through the restricted outlets 99. The combustible gaseous mixture is initially supplied to the heating units 92 at a relatively low pressure which may be equivalent to a pressure corresponding to about 5 or 6 inches of water column, for example, so that the gaseous mixture discharged from the spaces 98 can be ignited to produce and maintain flames at the outlets 99.

When a flame is being maintained at the outlet 99 of each heating unit, the pressure of the gaseous mixture supplied to the heating units may be momentarily reduced sufficiently to cause the flame of backfire through the outlet 99 onto the apertured screen 100 in the space 98. When this occurs, a plurality of flames are produced and maintained at the discharge ends of the small passages in the screens 100.

When the flames are being maintained within the spaces 98, the pressure of the gaseous mixture supplied to the heating units 92 may then be increased. After a short interval of time, the flames maintained at the screens 100 effect such heating of the inner refractory wall surfaces of the spaces 98 that these surfaces are heated to a high incandescent temperature. The heating of the inner refractory wall surfaces to a highly incandescent condition and the radiant heat therefrom promotes substantially complete combustion of the gas mixture in the combustion spaces 98 before the mixture reaches the outlets 99. From the outlet 99 of each heating unit 92 is discharged a high velocity jet or stream of heated gases at a temperature nearly equal to the temperature in the combustion space 98 and consisting substantially entirely of heated products of combustion.

In heating units of the type just described, the heated products of combustion are discharged from the combustion spaces 98 through the restricted outlets 99 at an elevated temperature ranging from 2700° F. to 2900° F. and higher when a combustible gaseous mixture of air and ordinary gas, such as city gas having a B. t. u.

rating of about 550 B. t. u. per cubic foot, for example, is supplied at a pressure in the neighborhood of three pounds per square inch. The heated gases in such case are discharged from the heating units 92 at an average velocity of about 750 feet or more per second and at a maximum velocity of about 1000 feet or more per second.

By reason of the high temperature developed at the heating stations 17 and 18, it is desirable to cool the heating units 92 to prevent overheating of the manifolds 101 and other parts of the apparatus adjacent thereto. As shown in Fig. 4, this is accomplished by providing hollow jackets 107 and 108 of cylindrical form at the top and outer peripheral surface of each refractory side wall 95. Further, a hollow jacket 109 of cylindrical form may be provided in the refractory side wall 95 adjacent to the refractory bottom 94 and manifold 101.

A suitable cooling liquid, such as water, for example, is circulated through the hollow jackets 107, 108 and 109. To this end the jacket 107 is provided with inlet and outlet openings 110 and 111, the jacket 108 with inlet and outlet openings 112 and 113, and the jacket 109 with inlet and outlet openings 114 and 115. The hollow jackets 107, 108 and 109 are partitioned in any suitable manner (not shown) between the inlet and outlet openings to cause the cooling liquid to circulate about the jackets; and suitable connections (not shown) may be provided to deliver cooling liquid to the jackets and discharge such cooling liquid therefrom to waste.

It has already been explained that the radial arms 12 are of hollow construction and cooling liquid is circulated therethrough in order to avoid overheating of the arms 12, particularly when the radial arms are moved to the heating stations 17 and 18. In addition, the C-shaped shell 84 also is desirably of hollow construction, as shown in Fig. 2, and provided with inlet and outlet openings (not shown) adjacent to the bottom and top edges of the shell and at the opposite ends thereof for circulating a cooling liquid therethrough. The C-shaped shell 84 shields the cylinder rod 29 and other parts of the heat treating apparatus from the high temperature heat produced at the heating stations 17 and 18. Hence, by circulating cooling liquid through the C-shaped shell 84, heat is effectively taken up by the cooling liquid and objectionable overheating of the parts of the heat treating apparatus is avoided.

By providing the heating stations 17 and 18 the work pieces 15 are heated to the desired elevated temperature in two stages, the initial heating of the work pieces being accomplished at the heating station 17 and the final heating being accomplished at the heating station 18. From the second heating station 18 the radial arms 12 of the carriage 11 carry the heated work pieces 15 to the quench station 19.

As shown in Figs. 1, 2, 3 and 5, the quench station 19 is located at one end of an arcuate shaped tank 116 provided at the top of the shell 26. The tank 116 is formed with an opening in the top and adapted to hold a body of quenching liquid, such as oil, for example, to the level 117 indicated in Fig. 2. When each work piece 15 moves to the quench station 19 and comes to a stop beneath the liquid level 117 in the tank 116, the work piece is positioned within a hollow ring or manifold 118 which is supported within the tank by a plurality of spaced brackets 119, as shown in Figs. 2 and 5.

The ring 118 is provided with a number of small openings distributed about the inner peripheral surface thereof for discharging the quench liquid under pressure to the outer peripheral surfaces of the work pieces which have been moved to the quenching station 19. By discharging the quench liquid from the ring 118 in this manner, vigorous circulation and turbulent movement of the quench liquid is promoted at regions closely adjacent to the work pieces 15 to effect rapid cooling, especially at the outer peripheral surfaces thereof. Further, the quench liquid discharged through a number of small openings formed in the ring 118 effectively breaks up any vapor film tending to form at the surface of the work pieces when the latter are immersed in the body of quench liquid at the quench station 19.

In the embodiment of the invention illustrated, provision is made for recirculating and cooling the quench liquid. As best shown in Figs. 2 and 6, the quench liquid passes through an outlet 120 provided at the upper end of a conduit 121 whose lower end is connected to the inlet of a pump 122 arranged to be driven by an electric motor 123. The pump 122 and motor 123 are mounted on the framework 21 within the shell 26 directly beneath the tank 116. The quench liquid is discharged from the pump outlet through a conduit 124 to a sediment separator 125 and thence passes from the latter through a conduit 126 into one end of a heat exchanger 127.

The quench liquid flows in one path of flow in the heat exchanger in thermal exchange relation with and out of physical contact with a cooling liquid, such as water, for example, which enters through a supply conduit (not shown) to an inlet 128 and is discharged to waste through a conduit (not shown) connected to an outlet 129. From the heat exchanger the cooled quench liquid passes through a riser conduit 130 which extends upwardly in the tank 116 and is connected at its upper end to the ring 118.

In order to adjust the pressure at which the quench liquid is discharged from the openings in the ring 118, a pressure relief valve 131 may be connected in the conduit 130. When the pressure of the quench liquid in the conduit 130 exceeds a predetermined pressure, determined by the adjustment of the relief valve 131, quench liquid is discharged through the valve 131 directly into the tank 116 and by-passes the ring 118.

In certain heat treating and hardening operations, it may be desirable to effect an initial quick cooling of the heated work pieces 15 in the quench tank 116 and thereafter effect further slow air cooling of the work pieces. Cooling of heated work pieces in this manner is often referred to as "time quenching" and employed where it is desired to utilize the residual heat in the work pieces to reheat the heat treated parts to a temperature approaching that used for tempering. Suitable mechanism is provided in the embodiment of the invention shown to effect such initial quick cooling of the work pieces in the quench tank 116. Such mechanism includes a hydraulic cylinder 132 which is disposed in the tank 116 beneath the ring 118 and in alignment with the spindles 57 when the latter are successively moved to the quench station 19, as shown in Fig. 2.

As will be described more fully hereinafter, a cylinder rod 133 of the hydraulic cylinder 132 is arranged to move upwardly in a definite interval of time after each work piece 15 comes to a stop in the quench tank 116. When this occurs the spindle 57 and work piece supported thereon, which is positioned at the quench station 19, moves upwardly such a distance that the work piece is well above the liquid level 117 and out of the body of quench liquid.

Since the spindles 57 are keyed to the bushings 58 at the outer ends of the radial arms 12, each work piece at the quench station 19 can be moved upwardly independently of the work pieces at the other stations; and, when the carriage 11 is thereafter raised or turned about its axis to advance each work piece to the next succeeding station, the carriage in its upward movement will lift the spindle from its raised position at the quench station 19 when the enlarged head 63 thereof engages the bearing 60. After the spindle 57 at the quench station 19 is picked off the upper end of the cylinder rod 133, the latter then moves downwardly, as will be described presently, to permit the succeeding work piece moving to the quench station 19 to come to a stop beneath the liquid surface level 117 directly opposite and within the annular ring 118.

The work pieces 15 are moved by the carriage 11 from the quench station 19 to what may be referred to as the cooling station 20. The work pieces 15 come to a stop at the cooling station 20 against a plate 134 provided on a pan 135 partially covering the end of the tank 116 nearest to the work loading and unloading station 16, as best shown in Figs. 1, 3 and 5. Hence, while the carriage 11 acts to bring certain of the work pieces 15 to one level at the heating stations 16 and 17 and in such case the enlarged heads 63 of the spindles 57 engage the bearings 60, the spindle 57 at the cooling station 20 is in a raised position and rests on the pan 134 and the enlarged head 63 thereof is in a raised position with respect to the bearing 60, as best shown in Fig. 1. The pan 135 slopes downwardly to permit quench liquid dripping from the work piece 15 resting on the plate 134 to flow by gravity into the tank 116.

The work pieces 15 move from the cooling station 20 back to the work loading and unloading station 16 at which station the work pieces come to a stop and are not rotated by the spindle 57, as previously explained. At the work loading and unloading station 16, each heat treated work piece is removed from its supporting member 56 and a fresh work piece is positioned thereon by an operator.

In order to collect quench liquid dripping from the work pieces at the work loading and unloading station 16, that station is provided with a cup-shaped screen 136 fixed at an opening in the top of the shell 26, as best shown in Fig. 5. Beneath the screen 136 is positioned a vessel 137, as best shown in Fig. 6, from which quench liquid flows through a conduit 138 into an upstanding vertical cylinder 139 in which the quench liquid is collected. After the cylinder 139 becomes filled with quench liquid to a definite level, as determined by a float operated device (not shown), for example, such device may be arranged to cause a pump 140 to operate and return the quench liquid through a conduit 141 to the tank 116.

In order to simplify the drawings, the connection of the conduit 141 to the tank 116 has not been illustrated. After the cylinder 139 is more or less depleted of quench liquid, the float device previously referred to acts to stop the pump 140. Hence, quench liquid dripping from the work pieces 15 at the work loading and unloading station 16 may be intermittently returned to the tank 116 after successive bodies thereof are collected in the cylinder 139.

As best shown in Figs. 2 and 9 to 12 inclusive, the mechanism for rotating the carriage 11 and indexing its movement, to advance each work piece from one station to a succeeding station, comprises the hydraulic cylinder 31 previously described and a cylindrical-shaped cam member 142 and associated cam follower 143.

The cylindrical-shaped cam member 142 is fixed at its upper end to the bottom ring-shaped plate 35 of the carriage 11 and depends downwardly therefrom within the C-shaped member 84, as best shown in Fig. 2. Hence, the C-shaped member 84 thermally shields the cam member 142 from the high temperature heat developed at the heating stations 17 and 18. The cam member 142 is formed with a cam race of the general shape shown in Fig. 11. The cam follower 143 is mounted on the base structure 10 and positioned at the gap in the C-shaped member 84, as seen in Fig. 5, at a region removed from the heating stations 17 and 18. The cam follower 143 comprises a rotatable roller fixed to a casting 144 which is rigidly mounted on an upright structural support 145 of the framework 21, as best shown in Figs. 2 and 6, to provide a sturdy and rigid support for the cam follower 143, whereby the cam follower will be capable of withstanding the sudden thrusts of the relatively heavy carriage 11 to which it is subjected when the carriage is being rotated.

Referring more particularly to Figs. 9 to 12 inclusive, the cam race includes spaced apart vertical slots 146 which are closed at their upper ends and in open communication at their lower ends with inclined arms 147 and 148 forming V-shaped portions of the cam race. When the cylinder rod 29, upon which the carriage 11 is rotatably mounted, is in its lowermost position (Fig. 2), the cam follower 143 is positioned at the upper closed end of one of the vertical slots 146. When the cylinder rod 29 is actuated to move the carriage and advance the work pieces 15, the rotatable cam follower 143, which is held in a fixed position on the casting 144, prevents turning movement of the cylindrical-shaped cam member 142 and the carriage 11 to which it is fixed, because of its position in the vertical slot 146 of the cam race. Hence, the initial increment of movement imparted to the carriage 11, when the latter is raised or lifted from its lowermost position, is a straight upward movement with respect to the cam follower 143.

Figure 12:
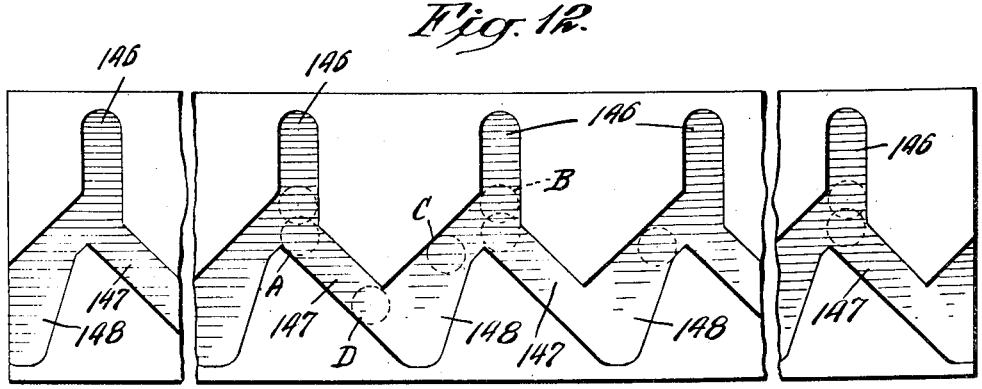
Fig. 12 is a developed view, partly broken away, of the cylindrical cam of Figs. 9 to 11.

After the carriage 11 is raised vertically a definite distance, the cam follower 143 strikes the bottom edge of an inclined arm 147 of the cam race, as indicated at A in Fig. 12. When this occurs, the carriage 11 is still being raised by the hydraulic cylinder 31, so that a turning or rotating movement is imparted to the cam member 142 and carriage 11 as the cam member 142 is being raised and the follower 143 is riding down the inclined arm 147 of the V-shaped portion of the cam race.

At the juncture of the arms 147 and 148 of the cam race, the hydraulic cylinder 31 reverses its stroke to lower the hydraulic cylinder rod 29 and carriage 11 mounted thereon. When the cylinder rod 29 moves downwardly, the cam follower 143 strikes the top edge of an inclined arm 148 of the cam race and rides along such top edge, thereby continuing to impart a turning or rotating movement to the cylindrical cam member 142 and carriage 11 to which it is fixed.

When the cylindrical cam member 142 turns such an angular distance that the cam follower 143 enters the lower end of the vertical slot 146 adjacent to the slot from which it has moved and is in the position indicated at B in Fig. 12, the cam member 142 and carriage 11 can only move vertically downward. Hence, the final increment of movement of the cylindrical cam member 142 and carriage 11, when the latter moves the work pieces 15 from one station to a succeeding station, is a straight downward movement. Such downward movement of the carriage 11 is effected during the final portion of the downward stroke of the hydraulic cylinder rod 29 during which time the vertical slot 146 moves down over the cam follower 143 until the closed end of the slot is a short distance from the cam follower. The gap or space between the closed end of each vertical slot 146 and cam follower 143 is provided when the carriage 11 is in its lowermost position so that the cam follower will not be required to support any part of the weight of the carriage.

The cam race in the cylindrical cam member 142 is of such shape that, when the cam member 142 is being raised, the cam follower 143 will always enter the upper end of an inclined arm 147 and cannot enter an arm 148 of the cam race from which it has previously emerged; and, when the cam member 142 is being lowered, the cam follower 143 will always pass from an arm 148 into a vertical slot 146 and cannot pass directly into an arm 147 from an arm 148. This is accomplished by extending one side wall of each slot 146 downward a greater distance than its opposite side wall, as best shown in the developed view in Fig. 12. A portion of the longer side wall of each slot 146 in a sense overlaps the upper end of the arm 148 communicating therewith, so that, due to the angular momentum of the cam member 142 and carriage 11 resulting from the turning movement imparted thereto, the longer side wall of each vertical slot 146 at its bottom portion will strike the cam follower 143; and, since the cam member 142 is being lowered at such time, the cam follower 143 can only enter the lower open end of the slot.

The bottom edges of the inclined arms 147 at their upper parts are directly beneath the lower open ends of the slots 146. Hence, when the cam member 142 and carriage 11 are being raised, the cam follower 143 passes directly from each vertical slot 146 onto the bottom edge portion of an arm 147 extending and projecting under the lower open end of the vertical slot. Since this initial increment of vertical movement is imparted to the cam member 142 and carriage 11 from a stop position of the latter, the cam follower 143 under no circumstance can pass into the upper end of the arm 148 from which it has previously emerged.

It will be noted in Fig. 12 that the bottom portions of the inclined arms 148 of the cam race are widened considerably with respect to the width of the cam race at the upper portions of these arms. It was found that, by properly adjusting the timing of the up strokes and down strokes of the hydraulic cylinder rod 29 and providing such widened portions in the cam race, the fixed rotatable cam follower 143, upon emerging from the lower ends of the inclined arms 147, would avoid striking the extreme bottom end portions of the cam race; and, after passing from each arm 147, next contact and engage the cam race at the position C in Fig. 12.

When the cam member 142 and carriage 11 are being raised and the cam follower 143 rides against the bottom edge of an arm 147, a turning movement is imparted to the cam member and carriage 11, as just explained. When the cam member 142 is raised to such a position that the cam follower is at the position D in Fig. 12, the cylindrical cam member 142 tends to move away from the cam follower 143 due to the angular momentum imparted to the cam member 142 and carriage 11 by the cam follower while riding against the bottom edge of the inclined arm 147 of the cam race. By providing the widened gaps at the bottom portions of the inclined arms 147 and reversing the stroke of the hydraulic cylinder 31 while the cam follower 143 is in such gaps, the cam follower will next engage the top edges of the arms 148 at the position C in Fig. 12. At the position C the cam follower 143 engages an inclined surface along which it can freely ride to continue imparting a turning movement to the cam member 142, without requiring the cam follower 143 to bring the carriage 11 and cylindrical cam member 142 to a complete stop when the hydraulic cylinder rod 29 reaches the upper limit of its stroke and starts moving downward again.

A control mechanism suitable for operating the hydraulic cylinder 31 is more or less diagrammatically shown in Fig. 13. The control mechanism illustrated provides an arrangement for alternately supplying a fluid, such as oil, for example, to the regions above and below the piston 30 in the hydraulic cylinder 31, to raise and lower the carriage 11 intermittently and thus advance and index the movement of the work pieces 15 from one station to a succeeding station.

In Fig. 13 oil is pumped from a reservoir 150 through a conduit 151 by a pump 152, the outlet of which is connected to a conduit 153 in which is provided a pressure relief valve 154, a check valve 155 for adjusting the oil delivery pressure, and a pressure gauge 156. A by-pass conduit 157 connects the pressure relief valve 154 to the upper part of the reservoir 150.

A valve mechanism 158 comprises a shell or housing formed to provide a central chamber 159 into which oil is discharged from the conduit 153, and side chambers 160, 161, 162 and 163 at each side of the central chamber. A shaft 164, to which a number of valves 165a, 165b, 165c and 165d are secured, extends through the valve mechanism housing.

When the shaft 164 is in the left-hand position shown in Fig. 13, oil is discharged from the conduit 153 into the central chamber 159 and passes into chamber 161 from which it is discharged through a conduit 166 to the bottom of the cylinder 31 below the piston 30. Under these conditions the piston 30 is caused to rise, thereby raising the hydraulic cylinder rod 29 and carriage 11 mounted thereon to which the cylindrical cam member 142 is secured.

As the piston 30 is being raised in the cylinder 31, the oil above the piston is forced out of the cylinder through a conduit 167 into chamber 160 and thence into the chamber 162 from which the oil passes into a conduit 168 and returns to the reservoir 150. While oil passing into conduit 168 can return to the reservoir 150, such oil cannot pass into the chamber 161 because the valve 165d prevents flow of oil therein from chamber 163.

When the shaft 164 is shifted to its right-hand position, valve 165a blocks chamber 160 from chamber 162, valve 165c blocks the central chamber 159 from chamber 161, and valves 165b and 165d are within the chambers 159 and 163, respectively.

In such right-hand position of the shaft 164, oil under pressure can only pass from the central chamber 159 into chamber 160 and flow therefrom through conduit 167 into the upper part of cylinder 31 above the piston 30. Under these conditions the piston 30 is moved downwardly, thereby lowering the hydraulic cylinder rod 29 and carriage 11 mounted thereon to which the cam member 142 is fixed.

As the piston 30 is being lowered in the cylinder 31, the oil below the piston is forced out of the cylinder through conduit 166 into chamber 161 and thence into chamber 163 from which the oil passes into conduit 168 and returns to the reservoir 150. The oil being returned to the reservoir 150 through conduit 168 from the chamber 163 cannot pass into chamber 160 because the valve 165a prevents flow of oil into that chamber from chamber 162.

To cause the shaft 164 to move back and forth between the left-hand position illustrated in Fig. 13 and the right-hand position just described, a pair of electromagnets 169 and 170 are provided at the ends of the shaft through which the end portions thereof extend. The electromagnets 169 and 170 are connected to a suitable source of supply of electrical energy through circuit means including conductors 171 and 172.

The conductor 171 is connected through conductor 173 to one terminal of electromagnet 169 and through another conductor 174 to one terminal of electromagnet 170. The conductor 172 is connected to a contact arm 175 which is adapted to move between stationary contact arms 176 and 177 and is held in its upper closed position against the contact arm 176 by a spring 178 having one end thereof connected to an insulating sleeve member 179 on the contact arm 175 and the opposite end thereof secured to a fixed support 180. The contact arm 175 is also connected to a downwardly depending plunger 181 of a solenoid 182 which, when energized, causes the contact arm 175 to move downwardly against the action of spring 178 and close contact arms 175 and 177.

When the contact arm 175 is in its upper position to close contact arms 176 and 177, a circuit is completed through conductor 183 for the electromagnet 170 to cause the shaft 164 to shift to its right-hand position described above; and, conversely, when the solenoid 182 is energized and the contact arms 175 and 177 close, a circuit is then completed through conductor 184 for the electromagnet 169 to cause the shaft 164 to shift to its illustrated left-hand position. The solenoid 182 is connected by conductors 185 and 186 to conductors 171 and 172, respectively. A suitable time operated switch 187 is connected in conductor 186 whereby the circuit for the solenoid 182 is intermittently closed and opened for desired intervals of time.

The shaft 164 may be journaled in any suitable manner at the ends of the valve mechanism housing and suitable stops 188 and 189 may be provided on the shaft which are engaged by abutments on the latter to limit the extent of axial movement imparted to the shaft. In this way the valves 165a, 165b, 165c and 165d will be properly positioned at the end of each stroke of the shaft 164, either to the left or to the right, depending upon whether electromagnet 169 or electromagnet 170 is energized.

The control mechanism for the hydraulic cylinder 132 at the quench station 19 is generally similar to that just described for the hydraulic cylinder 31. As more or less diagrammatically shown in Fig. 14, the control illustrated comprises a valve mechanism 158a generally like that seen in Fig. 13 in which similar parts are referred to by like reference numerals. The valve mechanism 158a in Fig. 14 operates to supply oil under pressure either below or above a piston 190 to which the rod 133 is fixed to cause the latter to move alternately upward and downward.

The oil circulating system provided for the main hydraulic cylinder 31 and shown in Fig. 13 may be employed for the valve mechanism 158a in Fig. 14. Thus, the oil delivered to the main central chamber 159 of the valve mechanism 158a in Fig. 14 may be delivered thereto under pressure through a conduit 153a which is connected to the conduit 153 in Fig. 13 between the check valve 155 and the pressure relief valve 154. Similarly, oil may be returned from the valve mechanism 158a in Fig. 14 through a conduit 168a connected to the upper part of the reservoir 150, as shown in Fig. 13. The operation of the valve mechanism 158a in Fig. 14 is similar to that described in connection with Fig. 13 and will not be repeated here.

The control mechanism of Fig. 14 differs from that shown in Fig. 13 in that the shaft 164a is caused to move to its left-hand position by an electromagnet 169a; and, when the electromagnet is deenergized, the shaft is caused to move to its right-hand position by the action of a spring 191.

The electromagnet 169a is connected to a source of supply of electrical energy through circuit means including conductors 171a and 172a. The conductor 171a is connected through a conductor 173a to one terminal of the electromagnet 169a, and the conductor 172a is connected to a stationary contact arm 175a. The contact arm 175a is adapted to move between a contact arm 177a and a stop 192 and is held in its upper position against the stop 192 by a spring 178a having one end thereof connected to an insulating sleeve member 179a on the contact arm 175a and the opposite end thereof secured to a fixed support 180a. The contact arm 175a is also connected to a downwardly depending plunger 181a of a solenoid 182a which, when energized, causes the contact arm 175a to move downwardly against the action of spring 178a and close contact arms 175a and 177a.

When the solenoid 182a is energized and contact arms 175a and 177a close, a circuit is then completed through conductor 184a for the electromagnet 169a to cause the shaft 164a to shift to its illustrated left-hand position against the action of spring 191. When the electromagnet 169a is deenergized, the shaft 164a is caused to shift to its right-hand position by the action of the spring 191. As in the control system illustrated in Fig. 13, solenoid 182a is connected by conductors 185a and 186a to conductors 171a and 172a, respectively. A suitable time operated switch 187a is connected in conductor 186a whereby the circuit for the solenoid 182a is intermittently closed and opened for desired intervals of time.

In view of the foregoing, it will now be understood that an improved heat treating machine has been provided for heat treating and hardening similar or like metallic work pieces in rapid succession. Only a single operator or attendant is required at the work loading and unloading station 16 to remove from the work supporting fixtures 14 the heat treated work pieces which move to that station and to position fresh work pieces on the fixtures 14 before the carriage moves to advance the fixtures to the next station.

In the instant embodiment of the invention the work pieces 15 by way of example are of annular form and shown as ring gears. Such ring gears are formed of ferrous metal and provided with teeth at the outer peripheral surfaces thereof. The two heating stations 17 and 18 are provided to apply high temperature heat in two stages directly against the teeth at the outer peripheral surfaces thereof. At the first heating station 17 heat is applied to bring the teeth to an elevated temperature below the critical hardening range, and at the second station 18 heat is rapidly applied to the outer peripheral surfaces of the ring gears to bring these surfaces of the teeth to the critical hardening temperature to the desired depth. It is to be understood that the number of heating stations provided may vary and that in some instances only a single heating station may be necessary while for heavier work pieces more than two heating stations may be required.

From the final heating station 18 the work pieces 15 are rapidly carried to the quench station 19 and submerged in the body of quench liquid maintained at that station. Thus, the ring gears or whatever other form the work pieces take are rapidly cooled below the critical hardening temperature to effect the desired hardening of the work pieces. By providing the spray device 118 beneath the liquid level 117 in the tank 116 and supplying quench liquid thereto under pressure, any vapor film tending to form at the outer peripheral surfaces of the ring gears is effectively broken up and the desired turbulent movement of the quench liquid is produced and promoted at vicinities closely adjacent to the outer peripheral surface areas of the ring gears at which maximum hardness is desired.

As previously explained, the hydraulic cylinder 132 is provided in the quench tank 116 to effect so called "time quenching" of the work pieces. When "time quenching" of the work pieces is desired, the hydraulic cylinder 132 becomes operable to raise the work pieces out of the quench tank 116 after each work piece has been submerged in the quench liquid for a predetermined interval of time which is less than the definite interval of time the carriage 11 remains stationary. The exact moment when the hydraulic cylinder 132 becomes operable to lift the quenched work pieces out of the body of quench liquid in the tank 116 can be accurately adjusted by proper regulation of the time operated switch 187a embodied in the control mechanism for the hydraulic cylinder 132 and shown in Fig. 14.

In order to maintain each work piece in its raised position at the quench station 19 after the hydraulic cylinder 132 is actuated to cause the cylinder 133 to move upward, the time operated switch 187a in Fig. 14 is so adjusted that the solenoid 182a will remain energized until the carriage 11 has moved upward a sufficient distance for the enlarged head 63 of the spindle 57 at the quench station to engage the bearing 60. When this occurs the raised work piece at the quench station 19 is then carried by the carriage from its raised position to the cooling station 20.

Immediately after the raised work piece at the quench station 19 is lifted from the upper end of the cylinder rod 133, the solenoid 182 becomes deenergized by proper adjustment of the time operated switch 187a, so that the cylinder rod 133 will move downward immediately and permit the next heated work piece moving to the quench station 19 to be completely submerged in the body of quench liquid and come to rest at the vicinity of the spray device 118.

As previously explained, "time quenching" is desirable when it is possible to utilize the residual heat in a work piece, as in the inner portion of a ring gear, for example, to reheat the outer toothed portions to a temperature approaching that used for tempering. In this way stresses in the outer hardened portions of the ring gears are relieved without the necessity of reheating the ring gears in a separate furnace to effect tempering of the hardened work pieces. It is to be understood, however, that the hydraulic cylinder 132 may be omitted when not found necessary and that each work piece may remain in the body of quench liquid during the entire interval of time the carriage 11 is stationary.

At the cooling station 20 the work pieces 15 are supported by the work supporting fixtures 14 at the plate 134 provided on the pan 135 which partially covers one end of the quench tank 116. Quench liquid from the work pieces 15 at the cooling station 20 drips onto the downwardly sloping pan 135 and returns by gravity to the quench tank 116. After being air cooled at the cooling station 20, the work pieces are then advanced to the work loading and unloading station 16 at which station the heat treated and hardened work pieces are removed from the work supporting fixtures 14.

The desired intermittent movement of the carriage 11 can be accurately adjusted by regulation of the time operated switch 187 embodied in the control mechanism for the hydraulic cylinder 31 and shown in Fig. 13. Each upward stroke and subsequent downward stroke of the cylinder rod 29 raises the carriage 11 from the position shown in solid line to the dotted line position in Fig. 1 and back to the position illustrated. Each pair of upward and downward strokes of the cylinder rod 29 constitutes a complete cycle of vertical movement necessary to move the carriage 11 such an angular distance that the work supporting fixtures are carried from one station to a succeeding station. The desired movement of the carriage is effected, as previously explained, by the cylindrical cam member 142 and cam follower 143 associated therewith.

By carrying the work supporting fixtures 14 from each station to a succeeding station in a path of movement in which the initial increments of movement are more or less straight upward and the final increments of movement are more or less straight downward, the heating stations 17 and 18 may be formed as shown and described above to completely encircle the work pieces 15 at close range; that is, the gaps at the heating stations between the work pieces 15 and the restricted outlets 99 of the heating units 92 are relatively small and in the order of one-fourth inch or less. By providing relatively small gaps at the heating stations 17 and 18 between the outer peripheral surfaces of the work pieces 15 and the sources of high temperature heating gases discharged through the restricted outlets 99, rapid heating of the work pieces is effected. Moreover, by driving the work supporting fixtures 14 so that the work pieces 15 are rapidly turned and rotated while being heated, substantially uniform heating of the entire outer peripheral surfaces of the work pieces 15 is effected.

While a single embodiment of the invention has been shown and described, it will be apparent to those skilled in the art that modifications and changes may be made without departing from the spirit and scope of the invention. For example, the cooling station 20 may in some cases be omitted and the work pieces 15 advanced directly from the quench station 19 to the work loading and unloading station 16. We therefore do not wish to be limited to the embodiment shown in the drawings and described in the specification and aim in the following claims to cover all of the modifications and changes which fall within the true spirit and scope of the invention.

What is claimed is:

1. Apparatus for heat treating metallic work pieces comprising structure providing a number of spaced apart stations for the work pieces including a work loading and unloading station and other stations at which the work pieces are heated and cooled, a carriage having mounted thereon a plurality of spaced apart work supporting fixtures for the work pieces, means for supporting said carriage for rotation, means for bodily raising and lowering said carriage, means attached to said carriage operable, when the latter is raised and lowered, to rotate said carriage on its supporting means to carry each work supporting fixture from one station to a succeeding station, driving means mounted on said carriage to rotate said fixtures, and means operable to disconnect from said driving means each work supporting fixture only while it is at the work loading and unloading station.

2. Apparatus for heat treating metallic work pieces comprising structure providing a number of stations including one or more heating stations in spaced apart relation, a carriage having mounted thereon a plurality of spaced apart work supporting fixtures for the work pieces, means for intermittently moving said carriage to carry the work supporting fixtures successively from one station to a succeeding station, said moving means comprising mechanism to raise and lower said carriage bodily and means to rotate the latter as it is being raised and lowered to move each work supporting fixture from one station to a succeeding station in a path of movement which includes an initial increment of movement which is generally upward and a final increment of movement which is generally downward, driving means mounted on said carriage to rotate said fixtures, and means to reduce the rotation of said work supporting fixtures only while they are at said work loading and unloading station.

3. Apparatus for heat treating metallic work pieces comprising structure providing a number of stations including a work loading and unloading station and one or more heating stations and a quench station in spaced apart relation, a rotatable carriage including a plurality of spaced apart rotatable work supporting fixtures for the work pieces, means for intermittently moving said carriage to carry the work supporting fixtures successively from the work loading and unloading station to said one or more heating stations and to said quench station and finally back to the work loading and unloading station, said moving means comprising mechanism to raise and lower said carriage bodily and means to rotate the latter to move each work supporting fixture from one station to a succeeding station in a path of movement which includes an initial increment of movement which is generally upward and a final increment of movement which is generally downward, driving means mounted on said carriage for rotating said work supporting fixtures, and means operable to disconnect the fixtures from the driving means while the fixtures are positioned at the work loading and unloading station.

4. Apparatus for heat treating metallic work pieces comprising structure providing a number of spaced apart stations for the work pieces including one or more stations at which the work pieces are heated, a carriage having mounted thereon a plurality of spaced apart rotatable work supporting fixtures for the work pieces, means for rotatably supporting said carriage, means for raising and lowering said carriage, cam means associated with said carriage operable, when the latter is raised and lowered, to impart movement to said carriage to carry each work supporting fixture from one station to a succeeding station, driving means including an electric motor mounted on said carriage for rotating said work supporting fixtures, means to energize said motor including a slip ring plate movable with said carriage, a brush plate whose brushes are adapted to be connected to a source of electrical supply and arranged to bear against said slip ring plate, and means for supporting said brush plate in a manner to prevent angular movement thereof and permit vertical movement with vertical movement of said carriage.

5. Apparatus for heat treating metallic work pieces comprising structure providing a number of stations including a work loading and unloading station and one or more heating stations and a quench station in spaced apart relation, a rotatable carriage having mounted thereon a plurality of spaced apart rotatable work supporting fixtures for the work pieces, means for intermittently moving said carriage to carry the work supporting fixtures successively from the work loading and unloading station to said one or more heating stations and to said quench station and finally back to the work loading and unloading station, said moving means comprising mechanism to raise and lower said carriage and means to rotate the latter to move each work supporting fixture from one station to a succeeding station in a path of movement which includes an initial increment of movement which is generally upward and a final increment of movement which is generally downward, driving means including an electrical motor mounted on said carriage for rotating said work supporting fixtures, means to energize said motor including a slip ring member movable with said carriage, a brush member whose brushes are adapted to be connected to a source of electrical supply and arranged to bear against said slip ring member, and means for supporting said brush member in a manner to prevent angular movement thereof and permit vertical movement with vertical movement of said carriage.

6. Apparatus for heat treating metallic work pieces comprising structure providing a number of stations including a work loading and unloading station and one or more heating stations and a quench station in spaced apart relation, a rotatable carriage comprising a number of radially extending arms and work supporting fixtures depending from the outer ends of such arms for the work pieces, means for intermittently moving said carriage to carry the work supporting fixtures successively from the work loading and unloading station to said one or more heating stations and to said quench station and finally back to the work loading and unloading station, said moving means comprising structure constructed and arranged to raise and lower said carriage as well as rotate the latter to move each work supporting fixture from one station to a succeeding station in a path of movement including an initial increment of movement which is generally upward and a final increment of movement which is generally downward, an annular-shaped vessel mounted on said carriage and open at the top, means for supplying cooling liquid to the vessel, said arms at least at the vicinities of said work supporting fixtures having hollow walls provided with inlets and outlets, means to conduct cooling liquid by gravity from said vessel to the inlets of said hollow walls, and means communicating with the outlets for carrying away liquid from the carriage.

7. Apparatus for heat treating metallic work pieces comprising structure providing a number of spaced apart stations for the work pieces including one or more stations at which the work pieces are heated, a carriage comprising a number of radially extending arms and work supporting fixtures depending from such arms for the work pieces, means for rotatably supporting said carriage, means for raising and lowering said carriage, means associated with said carriage operable, when the latter is raised and lowered, to impart movement to said carriage to carry each work supporting fixture from one station to a succeeding station, an annular-shaped vessel mounted on the carriage and open at the top, means for supplying cooling liquid to the vessel, said arms at least at the vicinities of the work supporting fixtures having hollow walls provided with inlets and outlets, means to conduct cooling liquid by gravity from said vessel to the inlets of said hollow walls, and means communicating with the outlets for carrying away liquid from the carriage.

8. Apparatus for heat treating metallic work pieces comprising structure providing a number of stations including one or more heating stations in spaced apart relation, a rotatable carriage comprising a number of radially extending arms and work supporting fixtures depending from the outer ends of such arms for the work pieces, means for intermittently moving said carriage to carry the work supporting fixtures successively from one station to a succeeding station, said moving means comprising structure constructed and arranged to raise and lower said carriage as well as rotate the latter to move each work supporting fixture from one station to a succeeding station in a path of movement including an initial increment of movement which is generally upward and a final increment of movement which is generally downward, an annular-shaped first vessel mounted on said carriage and open at the top, means including a stationary pipe for supplying cooling liquid to the vessel, said arms at least at the vicinities of said work supporting fixtures having hollow walls provided with inlets and outlets, a second stationary annular-shaped vessel open at the top and positioned beneath said radially extending arms, means to conduct liquid by gravity from said first vessel to the inlets of said hollow walls, means including piping communicating with the outlets and movable with the carriage for conducting liquid from said hollow walls to said second vessel, and means for flowing cooling liquid from said second vessel.

9. Apparatus for heat treating metallic work pieces comprising structure providing a number of stations including one or more heating stations in spaced apart relation, a rotatable carriage comprising a number of radially extending arms and work supporting fixtures depending from the outer ends of such arms for the work pieces, means for intermittently moving said carriage to carry the work supporting fixtures successively from one station to a succeeding station, said moving means comprising structure constructed and arranged to raise and lower said carriage as well as rotate the latter and move each work supporting fixture from one station to a succeeding station in a path of movement which includes an initial increment of movement which is generally upward and a final increment of movement which is generally downward, an annular-shaped vessel mounted on said carriage and open at the top, means including a stationary vertically disposed pipe having the lower end thereof positioned to supply liquid to the first vessel, said arms at least at the vicinities of said work supporting fixtures having hollow walls provided with inlets at one level and outlets at a higher level, means to conduct liquid by gravity from said vessel to the inlets of said hollow walls and means communicating with the outlets for removing from the carriage liquid overflowing from the hollow walls.

10. Apparatus for heat treating metallic work pieces comprising structure providing a number of stations including one or more heating stations in spaced apart relation, a rotatable carriage comprising a number of radially extending arms and rotatable work supporting fixtures depending from the outer ends of such arms for the work pieces, means for intermittently moving said carriage to carry the work supporting fixtures successively from one station to a succeeding station, said moving means comprising structure constructed and arranged to raise and lower said carriage as well as rotate the latter to move each work supporting fixture from one station to a succeeding station, an annular-shaped vessel mounted on said carriage and open at the top, means for supplying cooling liquid to the vessel including a stationary vertically disposed pipe having the lower end thereof positioned to supply liquid to the vessel, said arms at least at the vicinities of said work supporting fixtures having hollow walls provided with inlets and outlets, means to conduct liquid by gravity from said vessel to the inlets of said hollow walls, and driving means mounted on said carriage for rotating said work supporting fixtures.

11. Apparatus for heat treating metallic work pieces comprising structure providing a number of stations including one or more heating stations and a quench station in spaced apart relation, a carriage having mounted thereon a plurality of spaced apart vertically movable work supporting fixtures for the work pieces, and means for intermittently moving said carriage to carry the work supporting fixtures from one station to a succeeding station, said moving means comprising mechanism to raise and lower said carriage and means to rotate the latter to move each work supporting fixture from one station to a succeeding station in a path of movement which includes an initial increment of movement which is generally upward and a final increment of movement which is generally downward, said quench station comprising a vessel adapted to hold a body of quench liquid into which the heated work pieces are adapted to be submerged by the work supporting fixtures, and means separate from said moving means for raising the work supporting fixture at the quench station to lift the work piece carried thereby out of the body of quench liquid.

12. Apparatus for heat treating metallic work pieces comprising structure providing a number of stations including one or more heating stations and a quench station in spaced apart relation, a carriage including a plurality of spaced apart vertically movable work supporting fixtures for the work pieces, means for intermittently moving said carriage to carry the work supporting fixtures from one station to a succeeding station, said moving means comprising mechanism to raise and lower said carriage and means to rotate the latter to move each work supporting fixture from one station to a succeeding station, said quench station comprising a vessel adapted to hold a body of quench liquid, means positioned in the tank below the liquid level therein for discharging liquid under pressure into the liquid body at the immediate vicinity of the work pieces when the latter are positioned at the quench station, and means separate from said moving means for raising the work supporting fixture at the quench station to lift the work piece carried thereby out of the body of quench liquid.

13. Apparatus for heat treating metallic work pieces comprising structure providing a number of stations including one or more heating stations and a quench station in spaced apart relation, a carriage including a plurality of spaced apart vertically movable work supporting fixtures for the work pieces, time controlled means for intermittently moving said carriage at definite intervals of time to carry the work supporting fixtures successively from one station to a succeeding station, said moving means comprising mechanism to raise and lower said carriage and means to rotate the latter to move each work supporting fixture from one station to a succeeding station, said quench station comprising a vessel adapted to hold a body of quench liquid into which the work pieces are adapted to be submerged when the work supporting fixtures are positioned at the quench station, means for raising each work supporting fixture at the quench station to lift the work piece carried thereby out of the body of quench liquid, said time controlled means operating said raising means after the work pieces are submerged in such liquid for an interval of time less than the definite interval of time.

FREDERIC O. HESS.
FRED MAUD.
WILLIAM B. TROUPE.

REFERENCES CITED

The following references are of record in the file of this patent:

UNITED STATES PATENTS

| Number | Name | Date |
| --- | --- | --- |
| 634,979 | Headland | Oct. 17, 1899 |
| 643,278 | Sponsel | Feb. 13, 1900 |
| 736,103 | Howe | Aug. 11, 1903 |
| 1,194,906 | Walling | Aug. 15, 1916 |
| 1,388,575 | Kenworthy | Aug. 23, 1921 |
| 1,425,660 | Josephs, Jr., et al. | Aug. 15, 1922 |
| 1,539,848 | Kenworthy | June 2, 1925 |
| 1,592,661 | Gilman | July 13, 1926 |
| 1,836,337 | Riblett | Dec. 15, 1931 |
| 1,958,846 | Christensen | May 15, 1934 |
| 2,098,624 | Haub | Nov. 9, 1937 |

FOREIGN PATENTS

| Number | Country | Date |
| --- | --- | --- |
| 492,066 | Great Britain | May 14, 1938 |